US012734905B2

(12) United States Patent
Yaguchi

(10) Patent No.: US 12,734,905 B2
(45) Date of Patent: Sep. 15, 2026

(54) DRIVING SYSTEM

(71) Applicant: GKN Automotive Limited, Birmingham (GB)

(72) Inventor: Yuu Yaguchi, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 20 days.

(21) Appl. No.: 18/925,526

(22) Filed: Oct. 24, 2024

(65) Prior Publication Data

US 2025/0042262 A1 Feb. 6, 2025

Related U.S. Application Data

(63) Continuation of application No. PCT/JP2022/018930, filed on Apr. 26, 2022.

(51) Int. Cl.
*B60L 15/20* (2006.01)
*B60K 1/02* (2006.01)

(52) U.S. Cl.
CPC ........... *B60L 15/2036* (2013.01); *B60K 1/02* (2013.01); *B60L 2240/421* (2013.01)

(58) Field of Classification Search
CPC ........... B60L 15/2036; B60L 2240/421; B60L 2240/423; B60K 1/02; B60K 17/348; B60K 23/04; B60W 10/04; F16H 48/30
See application file for complete search history.

(56) References Cited

U.S. PATENT DOCUMENTS 5,002,147 A * 3/1991 Tezuka ............... B60K 23/0808 701/87
5,041,978 A * 8/1991 Nakayama ......... B60K 23/0808 701/84

(Continued)

FOREIGN PATENT DOCUMENTS

JP 2006183784 A 7/2006
JP 2008254458 A * 10/2008

(Continued)

OTHER PUBLICATIONS

JP-2008254458-A machine translation (Year: 2008).*

(Continued)

*Primary Examiner* — Angelina M Shudy
(74) *Attorney, Agent, or Firm* — Reising Ethington P.C.

(57) ABSTRACT

A driving system used for torque control is provided with: first and second speed sensors on first and second shafts; first output devices drivingly coupled to the first and second shaft; and an electronic control unit electrically connected to the first and second speed sensors and the first and second output devices and including a storage unit storing one or more values of differential torque ratios, the electronic control unit being configured to fetch a target torque value, determine a rotation speed difference, determine a sign from the determined difference and the target torque value, fetch one of the values from the storage unit, calculate from the fetched value and the determined sign a first distribution ratio, and perform control to cause the first and second output devices to output torques obtained by multiplying the calculated first distribution ratios by the target torque value.

5 Claims, 10 Drawing Sheets

(56) References Cited

U.S. PATENT DOCUMENTS 5,126,942 A * 6/1992 Matsuda ............ B60K 23/0808 701/76
5,225,984 A * 7/1993 Nakayama ......... B60K 23/0808 701/72
5,262,950 A * 11/1993 Nakayama ........... B60K 28/165 180/197
5,272,635 A * 12/1993 Nakayama .............. B60T 8/489 701/72
5,370,016 A * 12/1994 Fujita .................... F16H 61/061 74/336 R
5,683,324 A * 11/1997 Inoue ...................... F16H 15/38 475/216
5,868,642 A * 2/1999 Kobayashi ......... B60K 17/3462 475/203
5,906,557 A * 5/1999 Kobayashi ............ F16H 3/0915 475/199
6,059,065 A * 5/2000 Takeda ............... B60K 23/0808 701/69
6,505,702 B1 * 1/2003 Shinmura .............. B62D 9/002 701/41
9,725,014 B2 * 8/2017 Honda ................ B60L 15/2036
10,065,527 B2 * 9/2018 Honda .................. B60W 20/10
11,584,234 B2 * 2/2023 Brok ....................... B60L 3/102
11,787,410 B1 * 10/2023 Oh .......................... B60K 6/52 701/69
12,071,024 B2 * 8/2024 Okamura ................ B60L 15/20
2002/0123836 A1 * 9/2002 Komiyama ........... B60W 10/04 180/65.245
2004/0267429 A1 * 12/2004 Matsuno ............... B60W 40/09 701/72
2006/0030974 A1 * 2/2006 Tsukasaki ............. B60W 30/02 701/1
2008/0185199 A1 * 8/2008 Kimura .................. B60K 6/445 188/110
2008/0221766 A1 * 9/2008 Maeda .................. B60T 8/1755 701/70
2009/0012685 A1 * 1/2009 Maeda .................. B60W 30/02 701/70
2009/0012687 A1 * 1/2009 Maeda .................. B60W 30/02 701/70
2010/0006358 A1 * 1/2010 Ishikawa ............. B60W 30/188 180/65.265
2010/0025128 A1 * 2/2010 Abe ....................... H02K 51/00 310/112
2010/0174463 A1 * 7/2010 Uragami ............... B60W 30/02 701/70
2010/0175944 A1 * 7/2010 Hayashi ............. B60K 23/0808 180/242
2010/0252348 A1 * 10/2010 Ueda ...................... B60K 23/04 180/244
2011/0164230 A1 * 7/2011 Ito ....................... G03F 7/70725 355/53
2012/0053002 A1 * 3/2012 Schmidt .................. F16D 28/00 475/231
2012/0166055 A1 * 6/2012 Ozawa ................... B60K 23/08 701/69
2013/0261863 A1 * 10/2013 Noguchi ................. B60L 1/003 180/65.265
2015/0065296 A1 * 3/2015 Suto ...................... B60W 10/08 477/6
2015/0192192 A1 * 7/2015 Honda .................... F16H 48/11 475/10
2016/0090076 A1 * 3/2016 Tsuji .................... B60W 10/113 180/65.265
2016/0129810 A1 * 5/2016 Takahashi .............. B60K 6/445 903/903
2016/0129911 A1 * 5/2016 Takahashi ................ B60K 6/52 701/22
2016/0252348 A1 * 9/2016 Momiyama .......... G01C 15/002 342/357.34
2016/0368496 A1 * 12/2016 Honda ............... B60K 23/0808
2017/0008422 A1 * 1/2017 Honda .................. B60W 20/15
2018/0154882 A1 6/2018 Sasaki et al.
2019/0217723 A1 * 7/2019 Tsukashima ............. B60K 6/52
2019/0299796 A1 * 10/2019 Oyama ................... B60L 58/20
2019/0299797 A1 * 10/2019 Hasumi ................... B60L 50/20
2019/0316655 A1 * 10/2019 Osada ..................... F16H 3/724
2019/0337391 A1 * 11/2019 Crombez ........ B60W 30/18127
2020/0009962 A1 * 1/2020 Tanaka ............ B60W 30/18018
2020/0164744 A1 * 5/2020 Kishi ................. B60K 23/0808
2020/0331461 A1 * 10/2020 Imamura ......... B60W 30/18172
2021/0199164 A1 * 7/2021 Vroemen ............. B60W 10/08
2021/0293316 A1 * 9/2021 Hirota ..................... F16H 48/34
2021/0300380 A1 * 9/2021 Harada ............... B60L 15/2009
2021/0338499 A1 * 11/2021 Takahashi ................ B62M 6/50
2022/0274598 A1 * 9/2022 Miyamoto ............ B60W 30/20
2022/0324452 A1 * 10/2022 Diamond ................ B60L 3/102
2023/0056052 A1 * 2/2023 Ye ........................... B60L 15/32
2023/0241982 A1 * 8/2023 Manabe .................... B60L 9/18 701/22
2023/0271507 A1 * 8/2023 Nishigaki ........... B60L 15/2036 180/6.5
2023/0272598 A1 * 8/2023 Yoshimura ............ F16H 61/475 701/50
2023/0365001 A1 * 11/2023 Hiroi ................... B60L 15/2081
2024/0217519 A1 * 7/2024 Takami ............... B60W 30/188
2025/0042262 A1 * 2/2025 Yaguchi ............... B60K 17/348
2025/0091450 A1 * 3/2025 Shen ....................... B60L 15/20
2025/0091581 A1 * 3/2025 Yoon ..................... B60W 30/02
2025/0115135 A1 * 4/2025 Ito ............................ B60L 3/12
2025/0170896 A1 * 5/2025 Katayama ........... B60L 15/2036
2025/0376044 A1 * 12/2025 Isami .................. B60L 15/2009
2025/0381964 A1 * 12/2025 Okamura ............ B60L 15/2045

FOREIGN PATENT DOCUMENTS

JP 2008296828 A 12/2008
JP 2013169818 A * 9/2013
JP 2018167806 A 11/2018
WO WO2010078937 A1 7/2010
WO WO2016114282 A1 7/2016
WO WO2020129400 A1 6/2020

OTHER PUBLICATIONS

JP-2013169818-A machine translation (Year: 2013).*
Written Opinion & International Search Report for PCT/JP2022/018930 dated Jul. 19, 2022, (6 pages).
English Translation—International Search Report for PCT/JP2022/018930 dated Jul. 19, 2022.

* cited by examiner

DRIVING SYSTEM

CROSS REFERENCE TO RELATED APPLICATIONS

This application is a continuation Application of PCT International Application No. PCT/JP2022/018930 filed on Apr. 26, 2022, the entire contents of which are incorporated herein by reference.

TECHNICAL FIELD

The disclosure herein relates to a driving system used in a vehicle with a plurality of power sources for controlling torques output to shafts respectively corresponding to the power sources.

BACKGROUND

In a conventional vehicle, a torque generated by one power source is distributed to a plurality of driving wheels. For distribution used is a differential for example.

A differential without limiting differential motion is, when one of the shafts spins out, unable to output the torque even to the other shaft. Thus the differential is often provided with a mechanism for limiting or temporarily halting the differential motion. A mechanism for limiting the differential motion by any friction means for example is frequently referred to as a limited-slip differential (LSD), and particularly the one that can change the limiting power dynamically depending on the input torque is referred to as a torque-sensitive LSD. An LSD with a mechanical device for controlling the limiting power can be referred to as mechanical LSD and an LSD with an electronic control unit can be referred to as electronic LSD.

The following documents disclose related arts.

PCT International Publication WO 2010/078937 A1

PCT International Publication WO 2020/129400 A1

SUMMARY

In an electric vehicle, unlike a gasoline engine vehicle, a power source is relatively compact and therefore each driving wheel could be equipped with an independent power source. As torque control can be performed for each driving wheel, understeer and oversteer are readily prevented under proper torque control, or a unique vehicle behavior that is unlikely achieved by a conventional vehicle, such as torque vectoring, could be realized. However, a driver well skilled in conventional vehicle driving would be, when encountering a behavior contrary to his/her intention, difficult to experience comfortable drivability and may rather prefer a behavior performed by a power system with a conventional LSD.

The system disclosed hereafter realizes behaviors similar to those performed by a power system with a conventional LSD even though it is directed to a driving system for a vehicle with a plurality of power sources.

According to an aspect, a driving system used for controlling torque output to a first shaft and a second shaft, is provided with: a first speed sensor configured to measure a rotation speed of the first shaft; a second speed sensor configured to measure a rotation speed of the second shaft; a first output device drivingly coupled to the first shaft; a second output device drivingly coupled to the second shaft; and an electronic control unit electrically connected to the first and second speed sensors and the first and second output devices and including a storage unit storing one or more values of differential torque ratios, the electronic control unit being configured to fetch a target torque value, determine a difference in rotation speed of the first shaft from the second shaft, determine a sign from the determined difference in rotation speed and the target torque value, fetch one of the values from the storage unit, calculate from the fetched value and the determined sign a first distribution ratio in which the torque is to be distributed to the first shaft and a second distribution ratio in which the torque is to be distributed to the second shaft, and perform control to cause the first output device to output torque obtained by multiplying the calculated first distribution ratio by the target torque value and cause the second output device to output torque obtained by multiplying the calculated second distribution ratio by the target torque value.

BRIEF DESCRIPTION OF THE DRAWINGS

The following detailed description of certain embodiments and best mode will be set forth with reference to the accompanying drawings, in which.

DETAILED DESCRIPTION

Exemplary embodiments will be described hereinafter with reference to the appended drawings.

Figure 1:
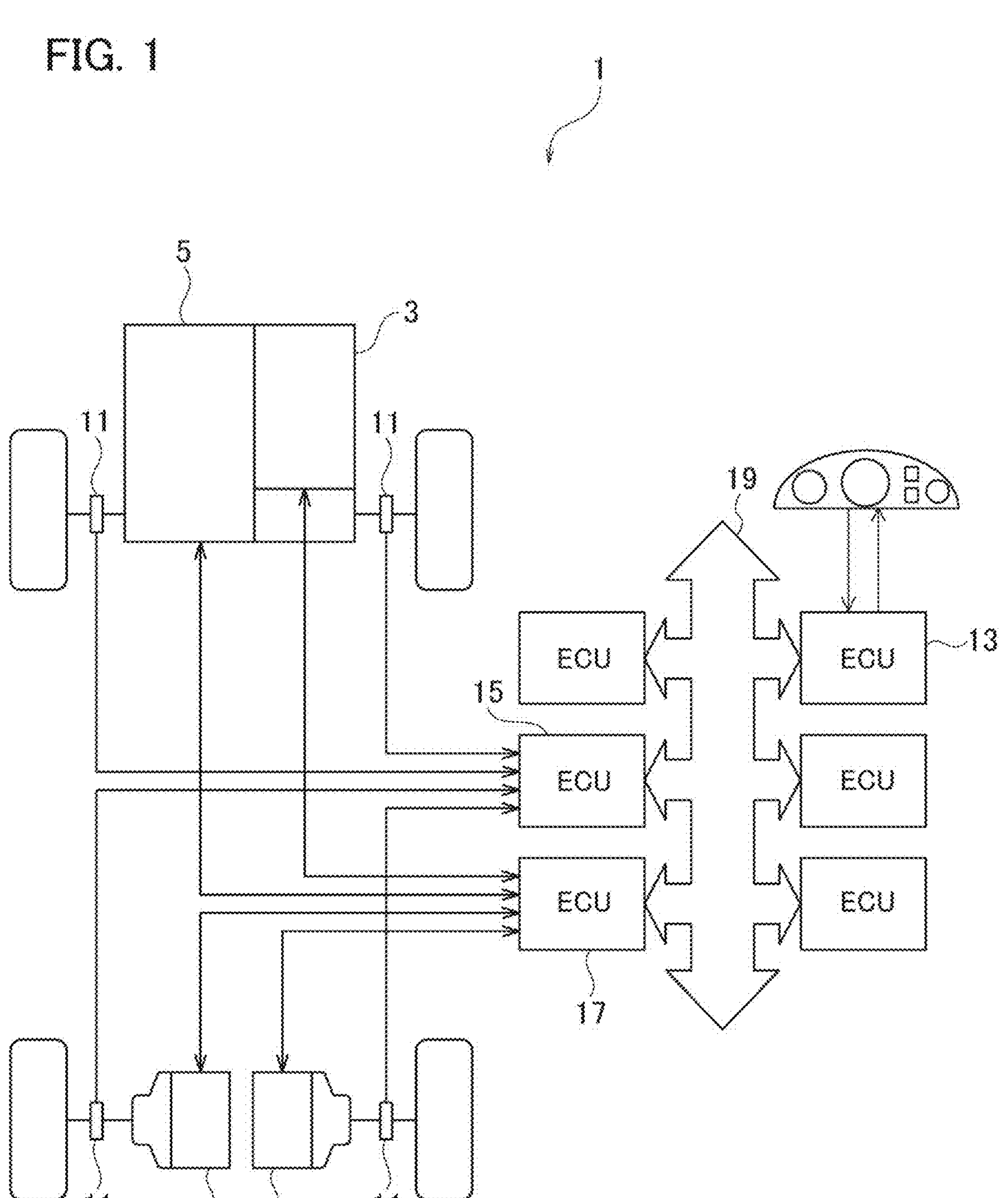
FIG. 1 is a schematic drawing showing an example of a vehicle to which a driving system according to the present embodiment is applied, where right and left rear axles are independently driven by respective power sources.
Figure 2:
FIG. 2 is a schematic drawing showing an example where front axles are as well driven by a motor.
Figure 2:
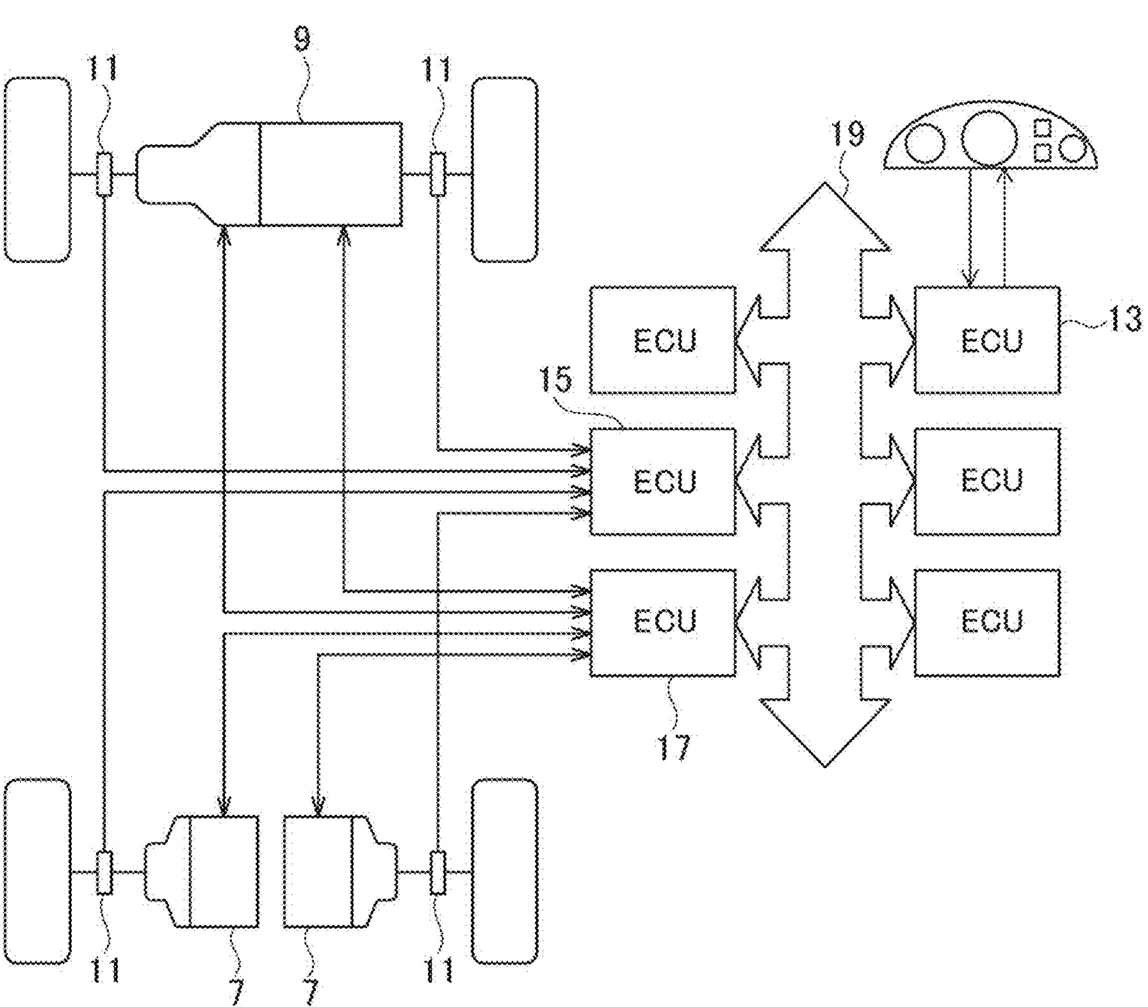

Referring to FIG. 1 for example, a driving system according to the present embodiment is applicable to a vehicle 1 in that right and left rear wheels are respectively driven by independently equipped output devices 7. The driving system controls each torque output to the right and left axles. Front wheels may be in this case either non-powered or instead driven by a power source 3 with an engine, or a hybrid system that is provided with both an engine and an electric motor. With the power source 3 combined is a gear system including a transmission 5 for transmitting torque to the front axles. Alternatively, the driving system is applicable to a vehicle in that front axles, instead of rear axles, are driven by independently equipped output devices 7. Still alternatively, as shown in FIG. 2, front axles may be driven by an electric power system 9 with an electric motor.

Figure 3:
FIG. 3 is a schematic drawing showing an example where the driving system controls both power sources at the front and the rear.
Figure 3:
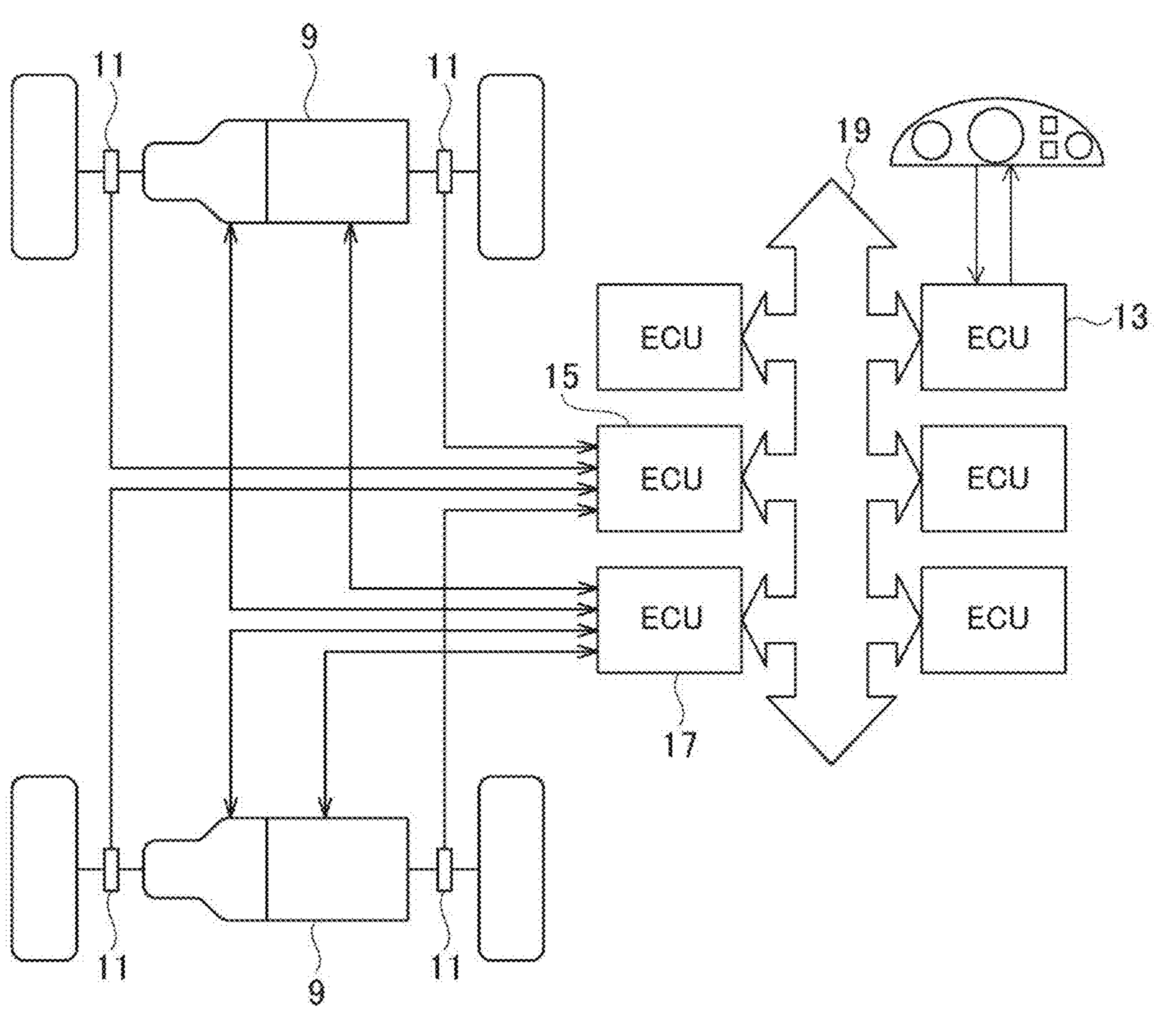
Figure 4:
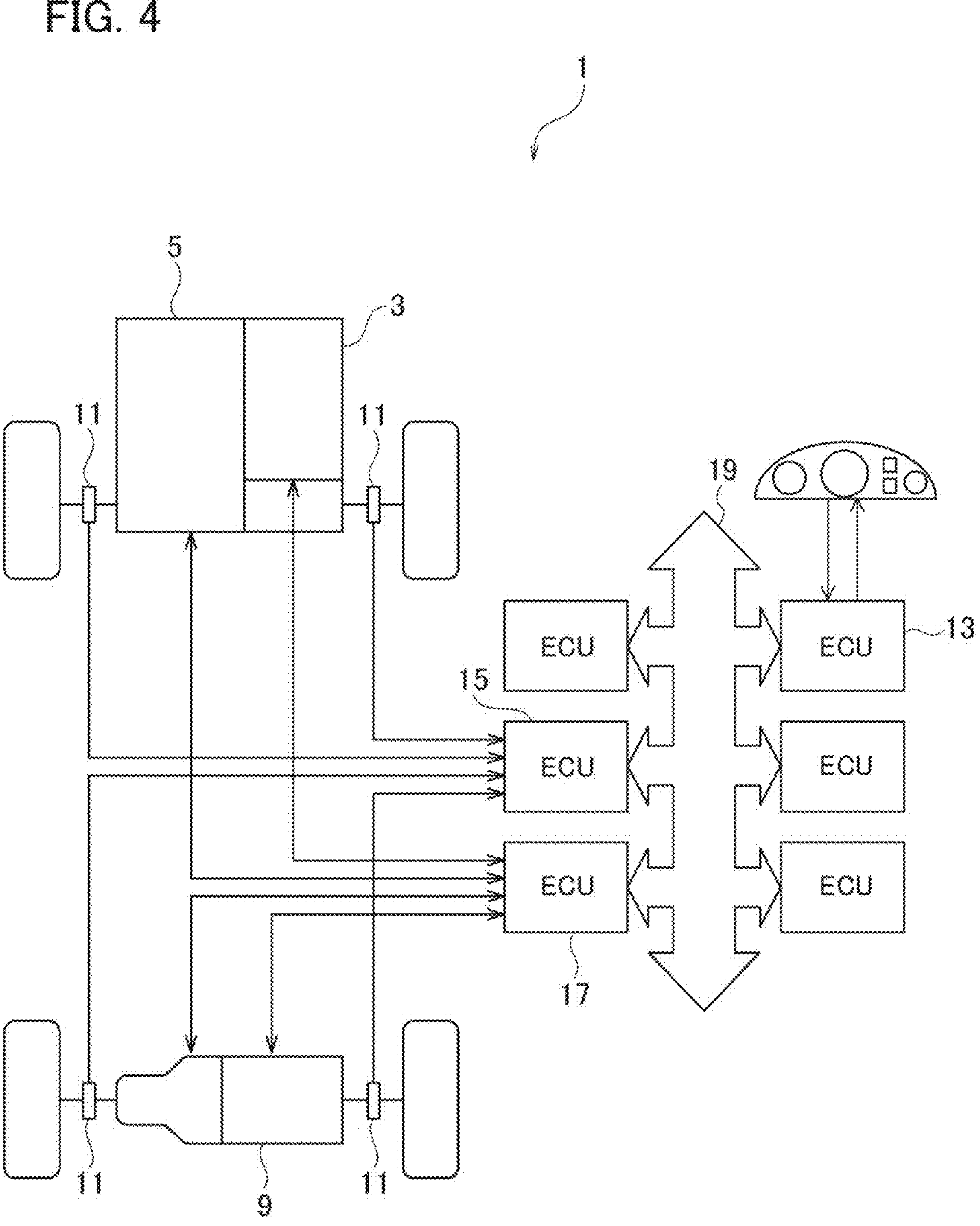
FIG. 4 is a schematic drawing showing an example where a driving system controls both a front power source and a rear front power source and also the power source at the front is an engine.

The driving system may be used for controlling torques respectively output to the right and left axles, but instead used for controlling torques output to the front axles and the rear axles by controlling front and rear power sources if the front axles and the rear axles are respectively equipped with the independent power sources. That which FIG. 3 shows is an example of such a vehicle 1, where electric power systems 9 drive both the front and the rear axles. Alternatively, the present embodiment is applicable to a vehicle in which either the front axles or the rear axles are driven by a power source 3 with an engine, or an engine as well as an electric motor.

Figure 5:
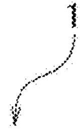
FIG. 5 is a schematic drawing showing an example where all the axles are independently driven by respective power sources.
Figure 5:
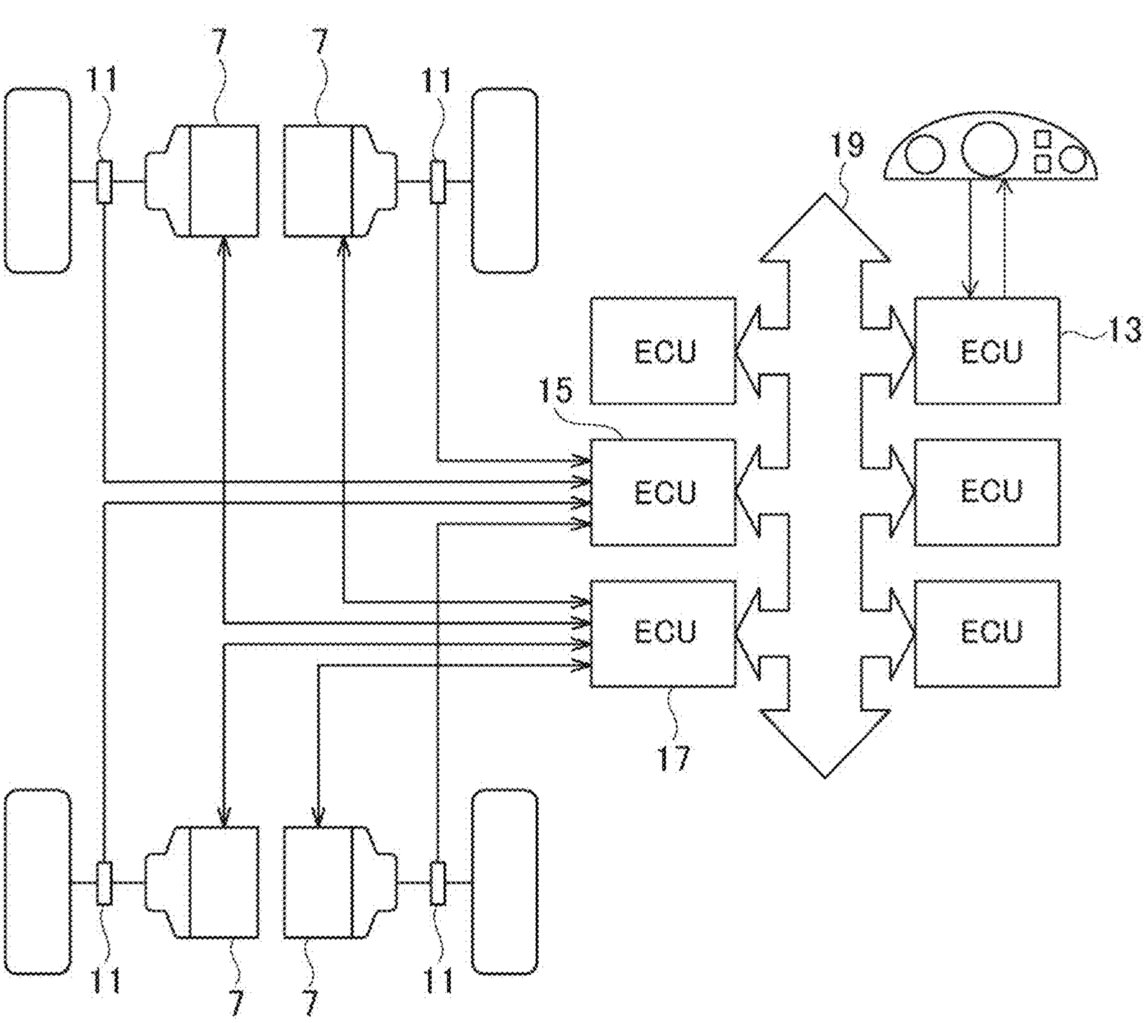

Still alternatively, as illustrated in FIG. 5, the driving system according to the present embodiment is applicable to torque control for the right and left front axles in addition to the right and left rear axles, more specifically, all the axles.

Referring to any of FIGS. 1 through 5, each ECU is provided with a storage unit storing commands and data and a microcontroller capable of reading out them and executing the commands. The number of ECUs that an ordinary vehicle has could reach several tens or more, but FIGS. 1 through 5 merely show only 6 ECUs thereof respectively. These ECUs 13-17 read out states of the respective elements on the vehicle and are mutually connected via a bus 19. The ECUs 13-17 mutually communicate or share information by communication through a so-called controller area network (CAN) for example. The information contains not only the read-out states but also requests for other ECUs and the respective ECUs thereby control the respective elements on the vehicle.

The ECU 13 is electrically connected to a console, a steering, an accelerator pedal, a brake pedal and such, reads out input by a driver therethrough, and controls them. Information acquisition and control are of course not exclusive to the single ECU but plural ECUs may take charge plural elements. The vehicle 1 is further provided with a plurality of speed sensors 11 for measuring rotational speeds of the respective axles, and the ECU 15 for example is electrically connected to these sensors to read out these outputs and calculate the rotational speeds. The ECU 17 for example is electrically connected to the power source 3, the transmission 5, the output devices 7 and/or the electric power system 9 and controls these actions.

Figure 6:
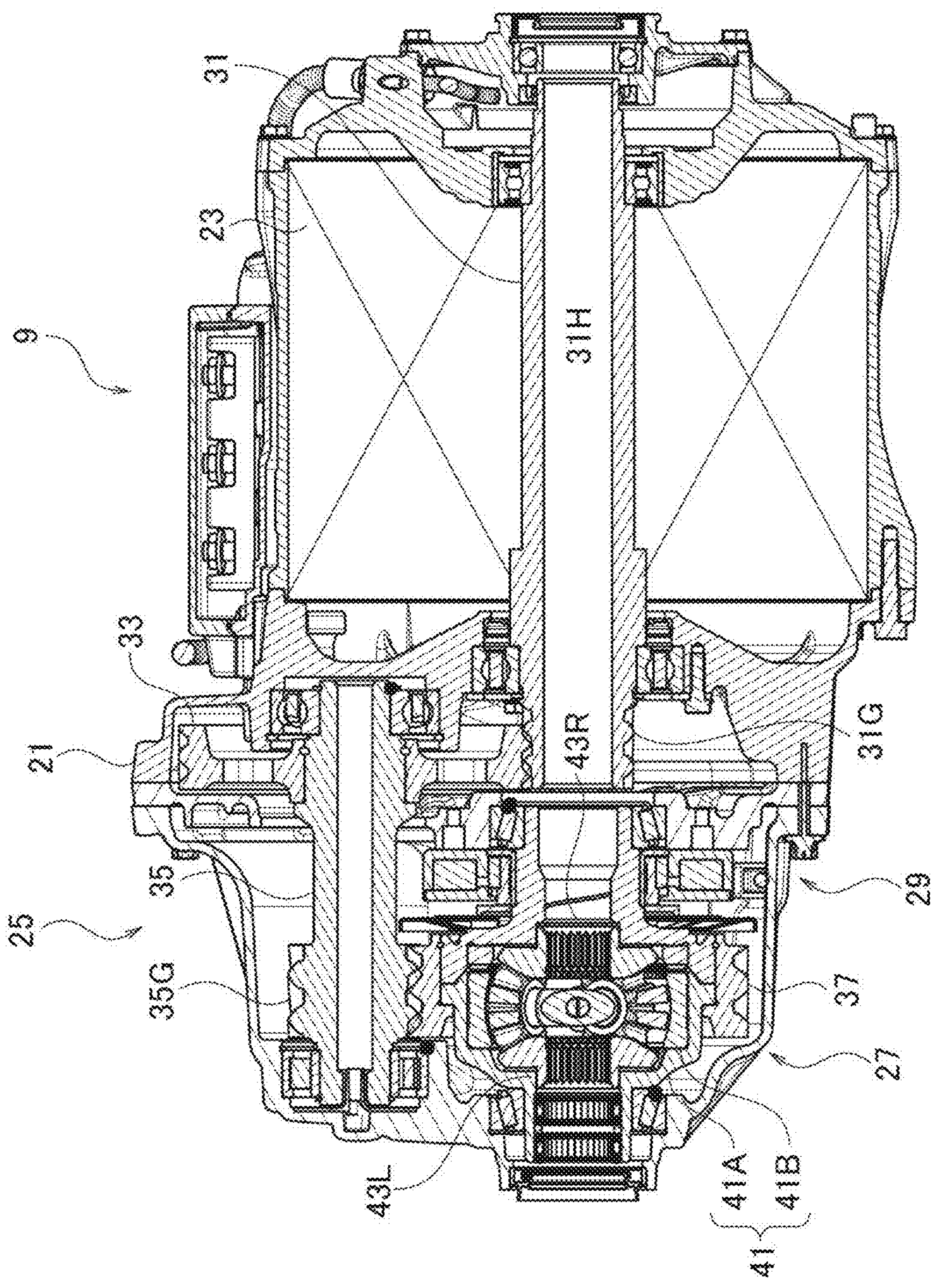
FIG. 6 is a sectional view of a gear device according to an example, which is used for a case in which one motor drives both axles.

Referring to FIG. 6, the electric power system 9 is, for example, provided with an electric motor 23, a reduction gear set 25 for transmitting the rotation generated by the electric motor 23 with reducing its speed, and a differential 27 for distributing torque to both the axles. The output device 7 has a similar configuration with an electric motor and a reduction gear set but lacks the differential 27, and the reduction gear set directly meshes with a gear section of the output shaft. Here, the reduction gear set 25 is not indispensable but beneficial in multiplying force output by the electric motor 23. The total body of the electric power system 9, or of the output device 7, may be housed in a single casing 21 whereas one or more elements thereof may be separated.

The electric motor 23 is, for example, a publicly-known inverter driven motor and, when electric power is input to its coil, generates torque about the axis in accordance with the input to rotate a rotor shaft 31. The rotor shaft 31 may be a hollow shaft and disposed coaxially with the differential 27 so that one of the axles can be led out through the hollow 31H. The coaxial arrangement is beneficial in reducing the total size of the electric power system 9. Of course, the electric motor 23 and these axles may not have a common axis instead. The rotor shaft 31 around its end is toothed to have gear teeth and, through this gear section 31G, outputs the rotation to the reduction gear set 25.

The reduction gear set 25 is provided with a gear shaft 35 with gear sections 33, 35G for example. The gear section 33 meshes with the gear section 31G of the rotor shaft 31 and the gear section 35 G meshes with a gear section 37 of the differential 27. The gear section 33 may be larger in diameter than the gear section 35G and thus the reduction gear set 25 can output the rotation with reducing its speed (that is, multiplying the force).

The differential 27 is provided with the gear section 37, around its outer periphery for example, and a casing 41 that supports a differential gear set within the interior. The differential gear set is provided with a pair of side gears 43R, 43L, which are respectively provided with engaging means such as splines and are thereby coupled with the right rear axle and the left rear axles. More specifically, the differential 27 distributes torque received through the gear section 37 to the right rear axle and the left rear axle respectively through the side gears 43R, 43L.

Although it is not essential in the present embodiment, the casing 41 may be composed of an outer casing 41A and an inner casing 41B coaxial therewith and relatively rotatable. When an actuator 29 is put into operation to engage the inner casing 41B with the outer casing 41A, these casings unitarily rotate and transmit the torque to the differential gear set. When disengaged, the torque is not transmitted.

Modes of torque control by the driving system according to the present embodiment will be described below with reference to FIGS. 7 through 10. While the following description relates to an example of torque distribution to right and left axles, the description can of course apply to any cases of torque distribution to front and rear axles.

Figure 7:
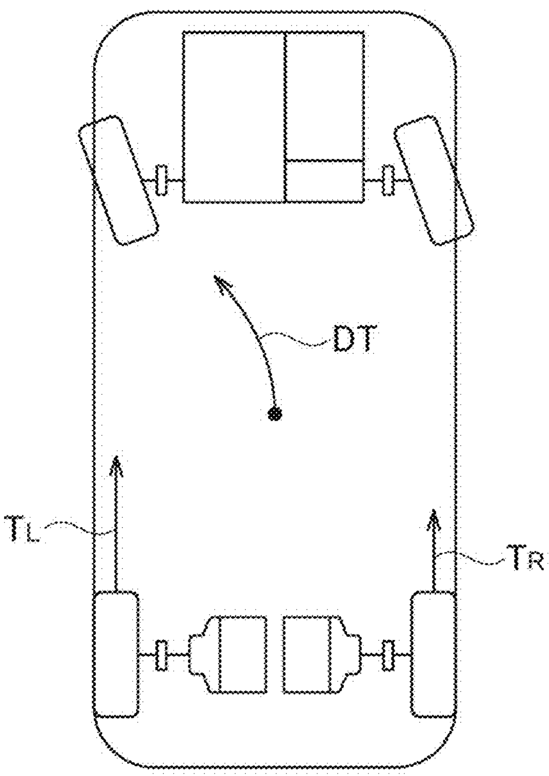
FIG. 7 is a drawing schematically showing torque to be created on inner and outer wheels when the vehicle makes a turn, showing a drive state where the vehicle drives forward.

In a case where the power source produces driving force in a forward direction and thereby the vehicle drives forward (DRIVE), when the driver turns the steering wheel leftward for example, as shown in FIG. 7, the vehicle follows a trajectory such as an arrow DT. The left rear wheel then revolves in a slower speed than the right inner wheel does. According to a conventional power system with an LSD, a torque $T_L$ distributed to the left rear wheel becomes greater than a torque $T_R$ distributed to the right rear wheel. Considering a simulation thereof, a torque distribution ratio can be calculated from a hypothetical locking rate in a hypothetically existing LSD.

Figure 9:
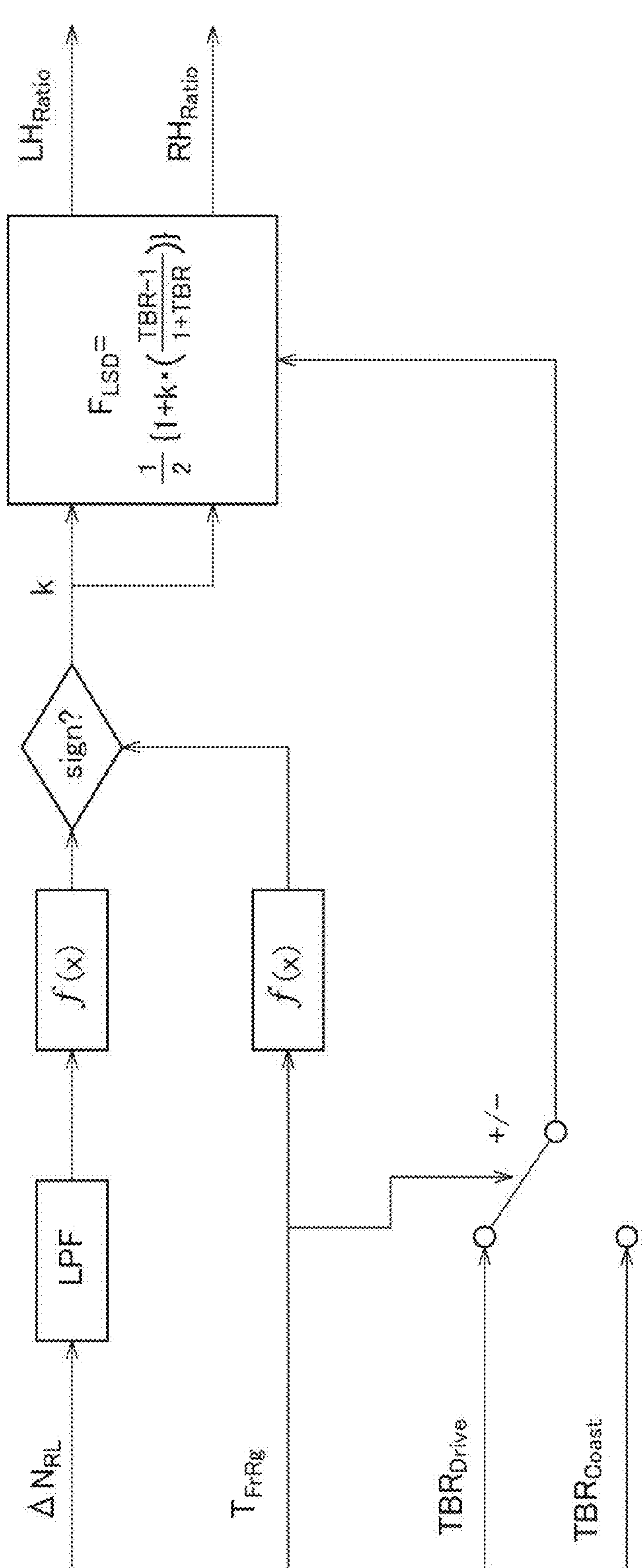
FIG. 9 is a diagram schematically illustrating arithmetic operations by an electronic control unit.

Referring mainly to FIG. 9, given that a ratio of the torque $T_L$ to the torque $T_R$ is defined as a torque bias ratio TBR, a hypothetical locking rate $f_{LSD}$ required to realize a target TBR is represented by a formula (TBR−1)/(TBR+1). A torque distribution ratio $LH_{Ratio}$ of torque distribution to the left rear wheel is $1/2(1+f_{LSD})$ and a torque distribution ratio $RH_{Ratio}$ to the right rear wheel is $1/2(1-f_{LSD})$. What are obtained by multiplying these ratios by the target torque value $T_{FrRg}$ are values of torques to be respectively output to the left rear wheel and the right rear wheel, and a sum of these values is of course consistent with the target torque value $T_{FrRg}$.

As will be readily understood, when the vehicle turns rightward, the torque distribution ratios are reversed, thereby the torque distribution ratio $LH_{Ratio}$ to the left rear wheel is $1/2(1-f_{LSD}))$ and a torque distribution ratio $RH_{Ratio}$ to the right rear wheel is $1/2(1+f_{LSD}))$.

Whether the vehicle turns rightward or left ward can be determined by the turning direction of the steering wheel, or alternatively determined by a sign of a rotation speed difference $\Delta N_{RL}$ between the right and left axles. Tentatively referring to $\Delta N_{RL}$ a case of turning leftward gives $\Delta N_{RL}>0$, a case of going straight gives $\Delta N_{RL}=0$, and a case of turning rightward gives $\Delta N_{RL}<0$. When these values are converted into signed binary numbers and then reflected in the value k (k=1,0,−1), the torque distribution ratio $F_{LSD}$ to the left rear wheel can be represented as $1/2(1+k\cdot f_{LSD}))$ (see the column at the right of FIG. 9). More specifically, it gives formulae $LH_{Ratio}=1/2(1+k\cdot f_{LSD})$ and $RH_{Ratio}=1/2(1-k\cdot f_{LSD}))$.

Figure 8:
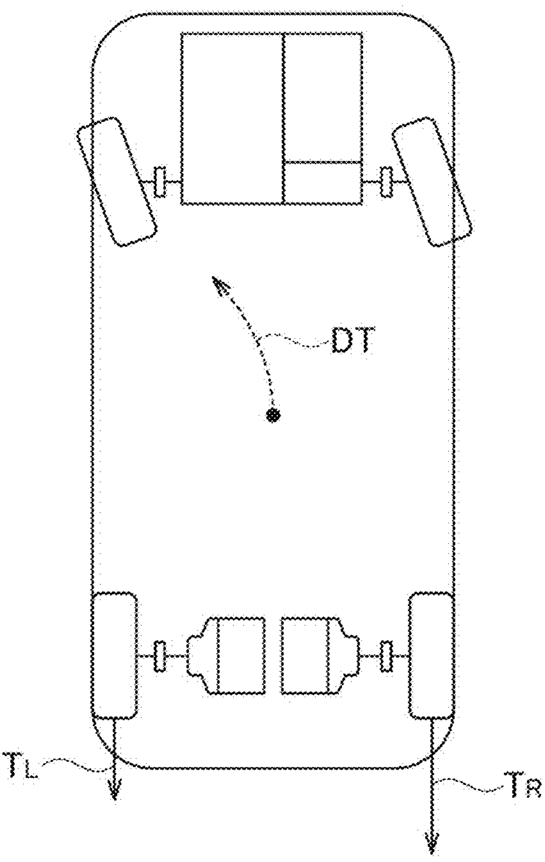
FIG. 8 is a drawing schematically showing torque to be created on inner and outer wheels when the vehicle makes a turn, showing a coast state where the vehicle freewheels forward.

In contrast, in a case where the vehicle freewheels forward (COAST), as shown in FIG. 8, normally engine braking or regenerative braking occurs, directions of torque $T_L$, $T_R$ are reversed (these signs are inverted) and its magnitudes are also inverted. Whether it's in a drive state or a coast state can be determined by a sign of the target torque value $T_{FrRg}$. To make the inversion of the sign by drive/coast reflected in the torque distribution ratio $F_{LSD}$, a product of the rotation speed difference $\Delta N_{RL}$ multiplied by the target torque value $T_{FrRg}$ is converted into a signed binary value and then made reflected in the value k (k=1,0,−1) (see the upper center of FIG. 9).

Further, it is possible to adopt distinct torque bias ratios TBR depending on whether in the drive state or the coast state. The ECU 17 can thus store a plurality of distinct values of $TBR_{Drive}$, $TBR_{Coast}$, and adopt one therefrom depending on whether in the drive direction or the coast direction. More specifically, referring to the lower left of FIG. 9, the forward-direction $TBR_{Drive}$ can be adopted as TBR when the target torque value $T_{FrRg}$ has a positive value, and the reverse-direction $TBR_{Coast}$ can be adopted as TBR when the target torque value $T_{FrRg}$ has a negative value. Independent optimum values can be adopted respectively as the forward-direction $TBR_{Drive}$ and the reverse-direction $TBR_{Coast}$, and one example of such a set is, but not limited to, the forward-direction $TBR_{Drive}=2.7$ and the reverse-direction $TBR_{Coast}=2.3$.

Figure 10:
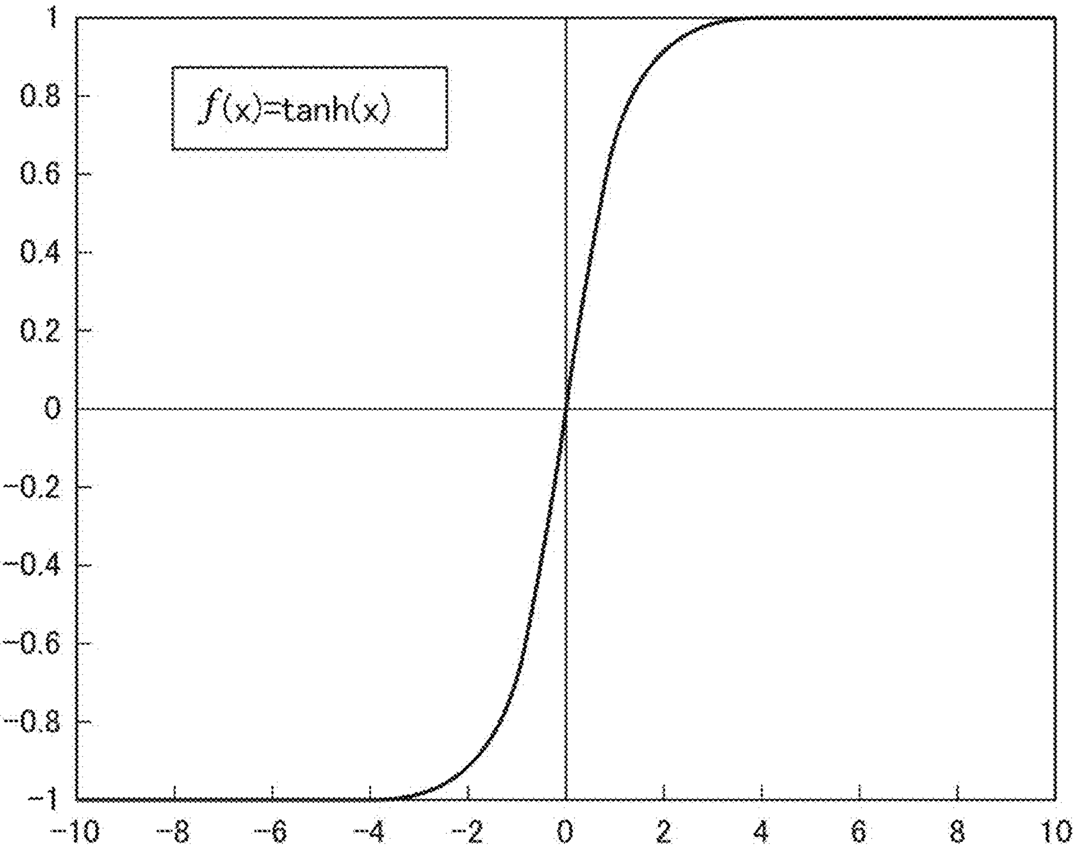
FIG. 10 is a graph showing an example of a function used for converting an input.

In the meantime, if $\Delta N_{RL}$ and $T_{FrRg}$ have values close to 0, slight disturbance could change signs of these values. This may cause rapid change of the value k and therefore gives rise to instability of the behavior of the driving system. Thus any one or both of $\Delta N_{RL}$ and $T_{FrRg}$ may be filtered through a low-pass filter or such in order to remove noise. Or, instead or in addition, the values may be converted by any proper (mathematical) function into other values so that the rapid change of the values can be smoothed. FIG. 10 shows a function as such an example, which is a so-called hyperbolic tangent function.

The ECU 17 can anytime fetch any values necessary for the aforementioned determinations and arithmetic operations through the CAN communication via the bus 19. The ECU 17 controls the left and right output devices 7 so that the devices output torque obtained by multiplying the calculated distribution ratios $LH_{Ratio}$, $RH_{Ratio}$ by the target torque value $T_{FrRg}$.

In the description above, the torque output to both the driving axles is controlled and the respective motors are so controlled as to make the sum of them be consistent with the target torque value $T_{FrRg}$. Provided that the torque is distributed by a differential, however, an average of peripheral speeds of both the driving wheels must be consistent with the vehicle speed if the driving wheels are free from slippage. If only the output torque are controlled and rotation speeds of the respective motors depart from this constraint, the vehicle might behave in a way the driver could not foresee. Thus in addition to the control on the torques, rotation speeds of the respective motors may be controlled.

Still further, the control may include another rotation speed control which limits difference in rotation speed between both the driving wheels, or still another control which makes the rotation speeds of the driving wheels be equal under a considerable condition. These controls render the simulation of LSD better and are beneficial in preventing wheelspin for example.

The rotation speed control may be regularly performed or limited under a particular condition. The former enables a control to keep a rotation speed within appropriate upper and lower limits relative to a particular rotation speed that satisfies a constraint by the vehicle speed. In the latter case, a particular condition may be determined in advance and next, only when the condition is satisfied, the rotation speed may be limited or the torque control may be switched to the rotation speed control.

The vehicle speed may be calculated from an average of outputs from the speed sensors 11 on the right and left driving axles, or may be determined by using an average of outputs from the speed sensors 11 on all the wheels. Still alternatively, any other proper values such as values of integral obtained by outputs from the acceleration sensor may be referred to. The ECU 17 can also fetch these values through the CAN communication via the bus 19 regularly.

As the aforementioned calculations can be made in a fixed way, they may be done not by the ECU 17 but by any discrete arithmetic circuit. More specifically, the calculations may be executed by an external arithmetic circuit under a control by the ECU 17.

Figure 11:
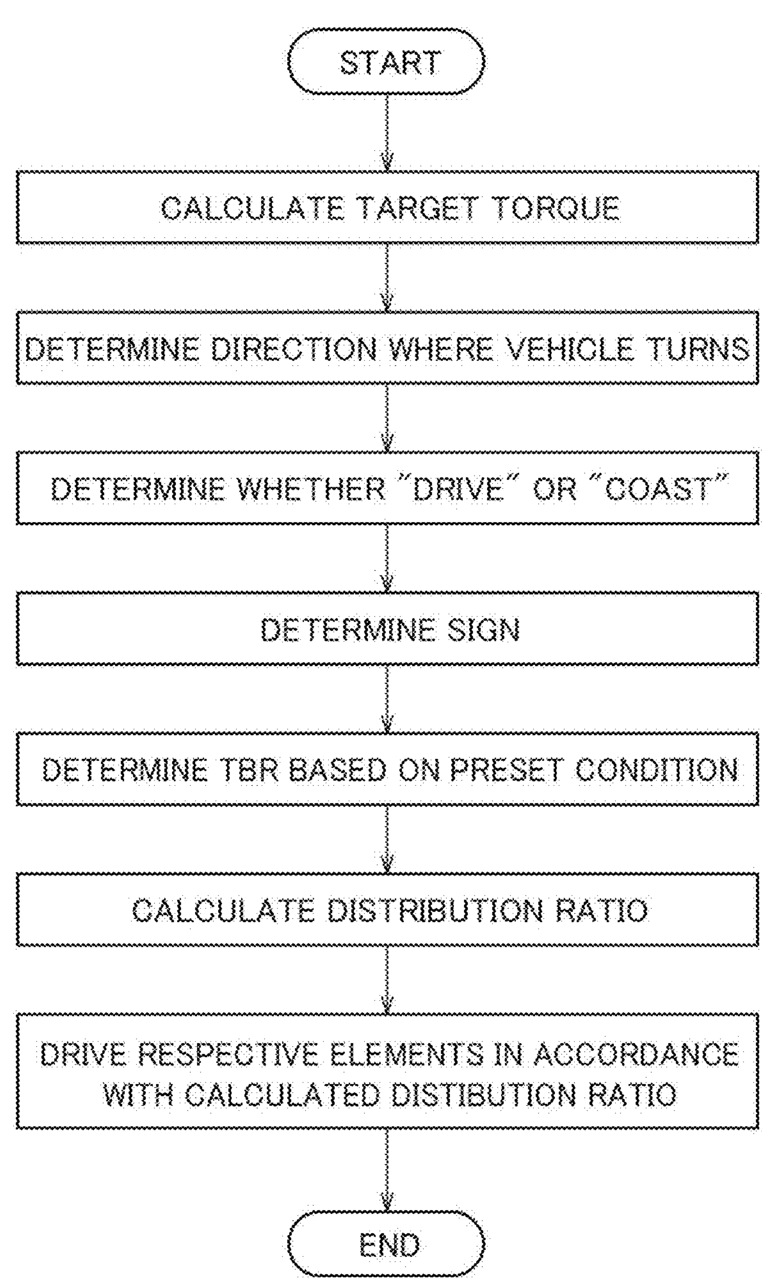
FIG. 11 is a flowchart of arithmetic operations and controls executed by the electronic control unit.

A process of controlling by the ECU 17 will be described hereafter with reference to FIG. 11. The ECU 17 first uses the CAN communication to fetch various values such as the target torque and the rotation speeds of the respective axles. The ECU 17 next calculates a target torque from these values and determines a direction where the vehicle turns and whether it's in a drive state or a coast state. The ECU 17 next determines a sign from the values such as the difference in rotation speeds and reflects the determined sign in the value k. The ECU 17 next determines TBR by selecting one from a data table stored in advance or in accordance with the predetermined condition. The ECU uses them to calculate a hypothetical locking rate and calculate a torque distribution ratio for the shafts from the calculated hypothetical locking rate. The ECU 17 controls electric power applied to the motors so as to make the output devices of the respective shafts output the torques obtained by multiplying the calculated torque distribution ratio by the target torque value. This process would be regularly repeated.

According to the aforementioned embodiment, even in a vehicle in which each driving wheel is equipped with an independent power source, torque on the respective driving wheel can be properly controlled in a way like as a behavior of a conventional vehicle. The embodiment can provide a driving experience for a driver well skilled in a conventional vehicle. Further, as parameters to be controlled are fully corresponding to parameters in conventional vehicles, this is beneficial in practically using any knowledge obtained in conventional vehicle design or more specifically the present embodiment is advantageous in light of easiness of vehicle design.

Although certain exemplary embodiments are described above, modifications and variations of the embodiments will occur to those skilled in the art, in light of the above teachings.

What is claimed is:

1. A driving system used for controlling torque output to a first shaft and a second shaft, comprising:

a first speed sensor configured to measure a rotation speed of the first shaft;

a second speed sensor configured to measure a rotation speed of the second shaft;

a first output device drivingly coupled to the first shaft;

a second output device drivingly coupled to the second shaft; and an electronic control unit electrically connected to the first and second speed sensors and the first and second output devices and including a storage unit storing one or more values of differential torque ratios, the electronic control unit being configured to fetch a target torque value, determine a difference in rotation speed of the first shaft from the second shaft, determine a sign from the determined difference in rotation speed and the target torque value, fetch a value of differential torque ratio from the storage unit, calculate from the fetched value of differential torque ratio and the determined sign a first distribution ratio in which the torque is to be distributed to the first shaft and a second distribution ratio in which the torque is to be distributed to the second shaft, and perform control to cause the first output device to output torque obtained by multiplying the calculated first distribution ratio by the target torque value and cause the second output device to output torque obtained by multiplying the calculated second distribution ratio by the target torque value.

2. The driving system of claim 1, wherein the first output device includes a first electric motor electrically connected to the electronic control unit and a reduction gear set configured to transmit a rotation created by the first electric motor to the first shaft with reducing a speed of the rotation, and the second output device includes a second electric motor electrically connected to the electronic control unit and a reduction gear set configured to transmit a rotation created by the second electric motor to the second shaft with reducing a speed of the rotation.

3. The driving system of claim 1, wherein the electronic control unit is configured to calculate the first distribution ratio on the basis of a formula $1/2\{1+k(TBR-1/TBR+1)\}$, and calculate the second distribution ratio on the basis of a formula $1/2\{1-k(TBR-1/TBR+1)\}$, where TBR represents the fetched value and k represents the determined sign.

4. The driving system of claim 1, wherein the storage unit stores two or more values of the differential torque ratios and the electronic control unit is configured to select and fetch one of the values stored in accordance with a sign of the target torque value.

5. The driving system of claim 1, wherein the electronic control unit is configured to adopt a sign of a result obtained by multiplying the target torque value by the determined difference in rotation speed as the determined sign.

* * * * *